United States Patent
Gell

(10) Patent No.: US 7,934,707 B2
(45) Date of Patent: May 3, 2011

(54) PNEUMATIC SPRING

(75) Inventor: Klaus Gell, Obernzell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 867 days.

(21) Appl. No.: 11/847,399

(22) Filed: Aug. 30, 2007

(65) Prior Publication Data

US 2008/0203632 A1  Aug. 28, 2008

(30) Foreign Application Priority Data

Aug. 31, 2006  (DE) .......................... 10 2006 040 804

(51) Int. Cl.
*F16F 9/04* (2006.01)

(52) U.S. Cl. ................................. 267/64.21; 267/64.24

(58) Field of Classification Search ............... 267/64.11, 267/64.12, 64.13, 64.19, 64.21, 64.23, 64.24, 267/64.26, 64.27
See application file for complete search history.

(56) References Cited

U.S. PATENT DOCUMENTS

| | | | |
|---|---|---|---|
| 2,704,665 A * | 3/1955 | Zoltok ........................ | 267/64.27 |
| 2,980,441 A | 4/1961 | Timpner et al. | |
| 3,043,582 A * | 7/1962 | Hirtreiter ................... | 267/64.24 |
| 3,527,451 A * | 9/1970 | Long, Jr. .................... | 267/64.21 |
| 3,653,651 A * | 4/1972 | Allinquant et al. ........ | 267/64.24 |
| 4,325,541 A | 4/1982 | Korosladanyi et al. | |
| 4,635,745 A | 1/1987 | Myers et al. | |
| 4,655,438 A * | 4/1987 | Cameron ...................... | 267/220 |
| 4,993,694 A * | 2/1991 | Gandiglio et al. ......... | 267/64.24 |
| 6,089,552 A | 7/2000 | Pahl | |
| 6,286,820 B1 * | 9/2001 | Raulf et al. ................ | 267/64.21 |
| 6,332,602 B1 * | 12/2001 | Oishi .......................... | 267/122 |

FOREIGN PATENT DOCUMENTS

| | | |
|---|---|---|
| CA | 2 272 830 A1 | 11/2000 |
| DE | 1 184 225 | 12/1964 |
| DE | 1 225 919 | 9/1966 |
| DE | 87 01 489.0 U1 | 4/1987 |
| DE | 197 55 549 A1 | 10/1998 |
| DE | 199 11 620 A1 | 9/2000 |
| EP | 0 403 447 A1 | 12/1990 |
| EP | 0 905 406 A1 | 3/1999 |
| GB | 986327 | 3/1965 |
| GB | 1043425 | 9/1966 |

* cited by examiner

*Primary Examiner* — Xuan Lan Nguyen
(74) *Attorney, Agent, or Firm* — Davis & Bujold, P.L.L.C.

(57) ABSTRACT

A pneumatic spring has a pneumatic spring bellows (1) made as a hollow cylinder and a damper (19) can be arranged in the pneumatic spring in such manner that a gap (24) is created through which ambient air can reach the damper (19) and cool it.

11 Claims, 1 Drawing Sheet

PNEUMATIC SPRING

This application claims priority from German Application Serial No. 10 2006 040 804.7 filed Aug. 31, 2006.

FIELD OF THE INVENTION

The invention relates to a pneumatic spring.

BACKGROUND OF THE INVENTION

Pneumatic springs of this type are used for example in combination with shock absorbers for suspension and damping in mobile vehicles, such as omnibuses.

To provide a compact structural unit, EP 0 905 406 B1 discloses a pneumatic spring with integrated damper in which the damper is completely integrated in the pneumatic spring, such that there is no contact between the damper and the ambient air in order to protect the damper from dirt and that the air in the pneumatic spring flows around the damper in a controlled way so as to cool it. Since when the air in the pneumatic spring is compressed it is also heated, the damper can only be cooled to an inadequate extent.

The purpose of the present invention is to provide a pneumatic spring with a damper, which is a compact structural unit and in which the damper is cooled sufficiently.

SUMMARY OF THE INVENTION

According to the invention, the pneumatic spring comprises a pneumatic spring bellows formed as a hollow cylinder. This enables the damper to be arranged in the pneumatic spring bellows in such a manner that between the inner boundary of the hollow cylinder of the pneumatic spring bellows and the outer boundary of the damper there is a gap, in communication with the surroundings such that ambient air can get into the gap. Preferably, the gap has a connection to the ambient air at the lower end surface of the pneumatic spring bellows and a connection to the ambient air at the upper end surface of the pneumatic spring bellows. This makes it possible for the damper to be cooled alone by the convection of the heated air around the damper. In addition, the gap between the pneumatic spring bellows and the damper changes each time the pneumatic spring bellows is compressed and expanded, so that when it is compressed the heated air is expelled out of the gap and when it expands cool ambient air is drawn in. Preferably, the pneumatic spring bellows consists of two individual elements, one individual element forming the outer boundary of the hollow cylinder and the other individual element forming the inner boundary of the hollow cylinder. This makes it possible to connect metallic elements to the pneumatic spring bellows at the respective end faces of the hollow cylinder, which serve to enable connection of the pneumatic spring bellows, for example, to vehicle body components or spring supports.

In another embodiment of the invention, the upper end face of the pneumatic spring bellows is connected to a dish-shaped component, this dish-shaped component, preferably having a bead with conical side surfaces, the bead being of circular shape, whereby the two individual elements of the pneumatic spring bellows can be sealed pressure-tight so forming a pressure-tight chamber.

In a further embodiment of the invention the dish-shaped component has a compressed air connection through which the pressure in the pneumatic spring bellows can be varied. The component on the lower end face of the pneumatic spring bellows is preferably formed like a piston, this component also having a hollow-cylindrical cavity connected to the pneumatic spring bellows, via vents in the piston-like element, where an additional pressure space for the pneumatic spring is created. The piston-like component is designed such that its end face can be connected to a spring support and the damper. In addition, the end face of the piston-like component has openings through which ambient air can flow into the gap between the damper and the pneumatic spring bellows.

In a further embodiment of the invention, the vehicle body component, for example the spring support, has additional means for controllably passing ambient air, through which ambient air passes into the gap in a controlled manner, for example, possibly by the controlled inflow of the air-flow created by driving.

The pneumatic spring bellows can be constructed to form a hollow cylinder which does not contact the damper at any point. Thus, the pneumatic spring is made as an independent circular component, such that for servicing purposes the damper can be replaced without having to dismantle the pneumatic spring. Furthermore, the pneumatic spring bellows is not damaged by movements of the damper.

In another embodiment, a separator tube can be arranged between the damper and the pneumatic spring bellows, which prevents the pneumatic spring bellows, when compressed, from being squeezed together toward the damper so that it comes in contact with the damper.

In a further embodiment, the pneumatic spring bellows can be made as a circular body, such as a tube of an automobile tire, so that the compressed air inlet can be vulcanized into place like the valve of an automobile tire.

Since the pneumatic spring bellows makes no contact with the damper, the pneumatic spring bellows can be arranged in the lower area of the damper, i.e., in the area of the moving damper tube, and does not have to be arranged in the area of the static damper tube.

Since the pneumatic spring bellows forms a hollow cylinder in which the damper is arranged with a gap, between itself and the hollow cylinder, the damper can be cooled by ambient air while also achieving a compact structural unit.

BRIEF DESCRIPTION OF THE DRAWINGS

The invention will now be described, by way of example, with reference to the accompanying drawings in which.

DETAILED DESCRIPTION OF THE INVENTION

Figure 1:
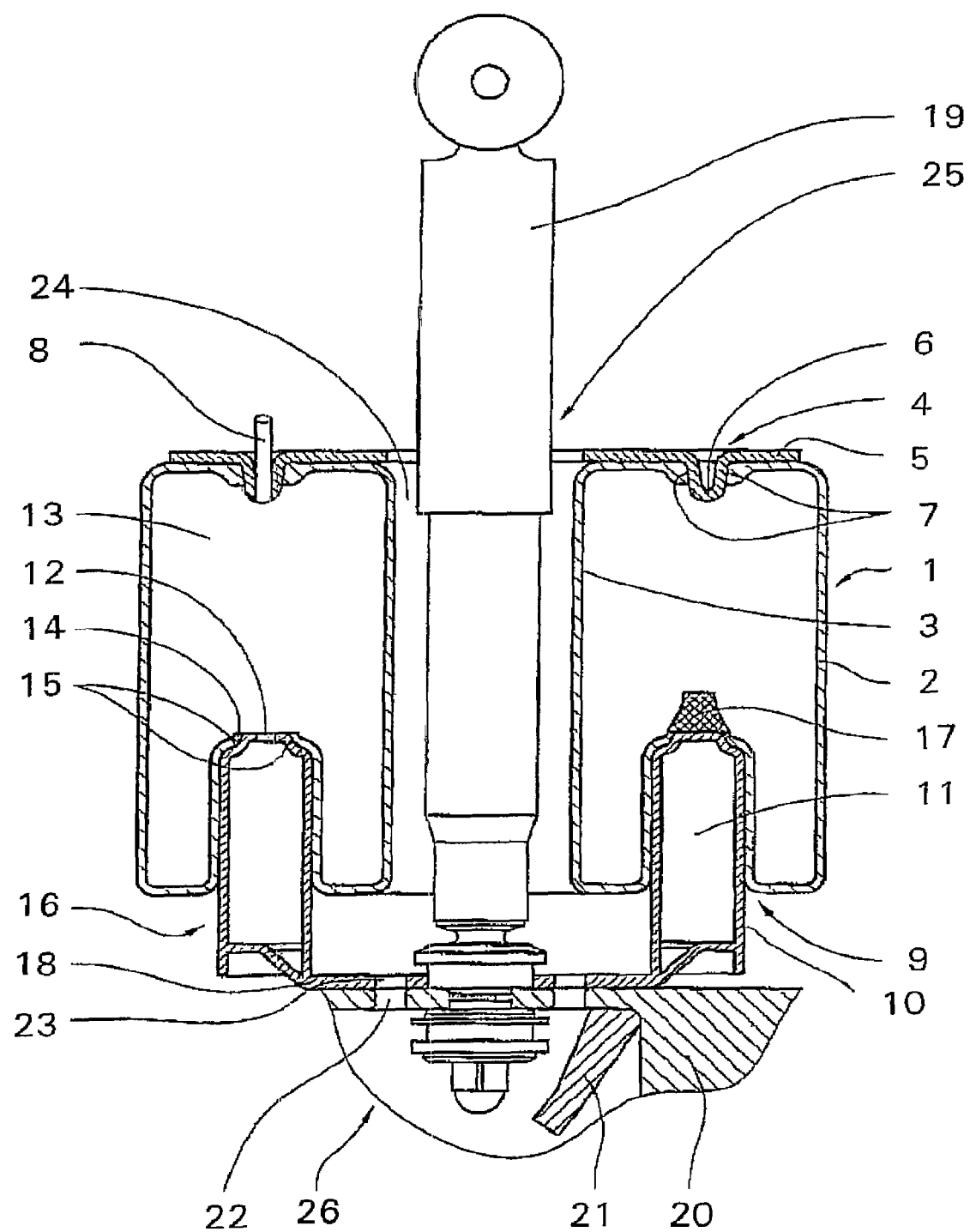
FIG. 1 shows a pneumatic spring with a pneumatic spring bellows according to the present invention.

FIG. 1 shows a pneumatic spring with a pneumatic spring bellows 1 consisting of an individual outer element 2 and an individual inner element 3. The individual outer element 2 forms the radially outer boundary of the pneumatic spring bellows 1 and the individual inner element 3 forms its radially inner boundary, so that the pneumatic spring bellows 1 forms a hollow cylinder. An upper end face 4 of the hollow cylinder is formed by a dish-shaped element 5 having a bead 6 with conical side surfaces 7. The bead 6 is of circular shape and with its conical surfaces 7 seals the individual outer element 2 and the individual inner element 3 in a pressure-tight manner. In addition, a compressed air inlet 8 is arranged in the bead 6. The compressed air inlet 8 can also be arranged in the piston-like element 10. On a lower end face 9 of the hollow cylinder is arranged a piston-like element 10 that forms a hollow-cylindrical cavity 11 connected to a chamber 13 of the pneumatic spring bellows 1 by vents 12. The piston-like element 10 also has a bead 14 in which the vents 12 are arranged and which has conical side surfaces 15 by way of which the individual outer element 2 and the individual inner element 3 are sealed to be pressure-tight relative to surroundings 16. Arranged on the bead 14 is an elastic element 17, which forms a stop for the bead 6 when the pneumatic spring is fully compressed, so that the pneumatic spring cannot be compressed any further. The piston-like element 10 has an end face 18 by way of which a damper 19 and the pneumatic spring can be connected to a spring support 20. The spring support 20 comprises a channeling instrument 21 for passing ambient air into apertures 22 and 23, through which ambient air from the surroundings 16 can flow into a gap 24. Since the pneumatic spring communicates with the surroundings 16, both at its upper end 25 and at its lower end 26, ambient air flows through the gap 24 and cools the damper 19. On compression, the individual inner element 3 deforms so that the gap 24 changes, whereby air escapes from the gap 24, whereas on expansion the shape of the individual inner element 3 changes in such a manner that air is drawn from the surroundings 16 back into the gap 24.

It is also possible for the pneumatic spring bellows 1 to have only one circular opening in the dish-shaped element 5, which is sealed pressure-tight by the bead 6, while the piston-like element 10 is made undivided. In this case, the elastic element 17 is integral with the pneumatic spring bellows 1 and the pneumatic spring bellows 1 can be fixed to the piston-like element 10 by means of fixing elements.

The pneumatic spring bellows 1 can also be made as one piece, such that this one-piece pneumatic spring bellows 1 has a circular opening at the piston-like element 10 and the pneumatic spring bellows 1 is connected to the dish-shaped element 5 by fixing elements. In this case too, the elastic element 17 can be integral with the pneumatic spring bellows 1.

The invention claimed is:

1. A pneumatic spring with a pneumatic spring bellows (1) that forms a closed chamber (13), the pneumatic spring being in active connection with a damper (19), the pneumatic spring bellows (1) forming a hollow cylinder and the damper (19) being arranged to form a gap (24), between an inner boundary of the hollow cylinder and an outer boundary of the damper (19), in which ambient air flows for cooling the damper (19);
   the pneumatic spring bellows (1) comprises a first individual element (2), forming an outer boundary of the hollow cylinder, and a second individual element (3), forming the inner boundary of the hollow cylinder;
   a piston-like component (10) couples, at a lower end face (9) of the hollow cylinder, the first individual element (2) and the second individual element (3);
   the piston-like component (10) has a circular bead (14), with conical side surface (15), which couple the first individual element (2) and the second individual element (3) in a pressure-tight manner; and
   the circular bead (14) has at least one vent (12) by which a cavity (11), formed by the piston-like component (10), is connected to a chamber (13) formed by the pneumatic spring bellows (1).

2. The pneumatic spring according to claim 1, wherein a dish-shaped component (5) connects, at an upper end face (4) of the pneumatic spring bellows (1), the first individual element (2) and the second individual element (3).

3. The pneumatic spring according to claim 2, wherein the dish-shaped component (5) has a circular bead (6) with conical side surfaces (7) which couple the first individual element (2) and the second individual element (3) in a pressure-tight manner.

4. The pneumatic spring according to claim 2, wherein the dish-shaped component (5) has a compressed air inlet (8).

5. The pneumatic spring according to claim 1, wherein the piston-like component (10) has an end face (18) for attaching the pneumatic spring to the damper (19) and the end face (18) has at least one aperture (23) for connecting the gap (24) to the ambient air from the surroundings (16) of the pneumatic spring.

6. The pneumatic spring according to claim 1, wherein the pneumatic spring is connected to a spring support (20), which comprises a channeling instrument (21) for controlled admission of the ambient air into the gap (24).

7. A pneumatic spring with a pneumatic spring bellows (1) that forms a closed chamber (13), the pneumatic spring being in active connection with a damper (19), the pneumatic spring bellows (1) forming a hollow cylinder and the damper (19) being arranged to form a gap (24), between an inner boundary of the hollow cylinder and an outer boundary of the damper (19), in which ambient air flows for cooling the damper (19);
   the pneumatic spring bellows (1) comprises a first individual element (2), forming an outer boundary of the hollow cylinder, and a second individual element (3), forming the inner boundary of the hollow cylinder;
   a piston-like component (10) couples, at a lower end face (9) of the hollow cylinder, the first individual element (2) and the second individual element (3);
   the piston-like component (10) has a circular bead (14), with conical side surfaces (15), which couple the first individual element (2) and the second individual element (3) in a pressure-tight manner; and
   at least one elastic element (17) is arranged on the circular bead (14) to limit a spring path when the pneumatic spring is fully compressed.

8. The pneumatic spring according to claim 7, wherein a dish-shaped component (5) connects, at an upper end face (4) of the pneumatic spring bellows (1), the first individual element (2) and the second individual element (3).

9. The pneumatic spring according to claim 8, wherein the dish-shaped component (5) has a circular bead (6) with conical side surfaces (7) which couple the first individual element (2) and the second individual element (3) in a pressure-tight manner.

10. The pneumatic spring according to claim 7, wherein the piston-like component (10) has an end face (18) for attaching the pneumatic spring to the damper (19) and the end face (18) has at least one aperture (23) for connecting the gap (24) to the ambient air from he surrounding (16) of the pneumatic spring.

11. The pneumatic spring according to claim 8, wherein the dish-shaped component (5) has a compressed air inlet (8).

\* \* \* \* \*